(12) United States Patent
Tengfjord et al.

(10) Patent No.: US 10,466,054 B2
(45) Date of Patent: Nov. 5, 2019

(54) METHOD AND SYSTEM FOR ESTIMATING RELATIVE ANGLE BETWEEN HEADINGS

(71) Applicant: ASCOM (SWEDEN) AB, Göteborg (SE)

(72) Inventors: Hampus Tengfjord, Göteborg (SE); Jonatan Eriksson, Göteborg (SE)

(73) Assignee: ASCOM (Sweden) AB, Göteborg (SE)

( * ) Notice: Subject to any disclaimer, the term of this patent is extended or adjusted under 35 U.S.C. 154(b) by 184 days.

(21) Appl. No.: 15/532,269

(22) PCT Filed: Dec. 3, 2014

(86) PCT No.: PCT/SE2014/051437
§ 371 (c)(1),
(2) Date: Jun. 1, 2017

(87) PCT Pub. No.: WO2016/089263
PCT Pub. Date: Jun. 9, 2016

(65) Prior Publication Data
US 2017/0343355 A1     Nov. 30, 2017

(51) Int. Cl.
*G01C 21/16* (2006.01)
*G01C 21/20* (2006.01)

(52) U.S. Cl.
CPC .......... *G01C 21/165* (2013.01); *G01C 21/20* (2013.01); *G01C 21/206* (2013.01)

(58) Field of Classification Search
CPC .... G01C 21/165; G01C 21/20; G01C 21/206; G01C 21/16
(Continued)

(56) References Cited

U.S. PATENT DOCUMENTS 8,694,251 B2    4/2014  Janardhanan et al.
2012/0245839 A1  9/2012  Zainab et al.
(Continued)

FOREIGN PATENT DOCUMENTS

WO       2014110672 A1   7/2014
WO    WO 2016/089263 A1  6/2016

OTHER PUBLICATIONS

Ali, et al., "Heading Misalignment Estimation Between Portable Devices and Pedestrians," Proceedings of the 26th Int'l Tech. Meeting of the ION Satellite Div., ION GNSS+, pp. 1626-1633 (Sep. 16-20, 2013).
(Continued)

*Primary Examiner* — John H Le
(74) *Attorney, Agent, or Firm* — Hamilton, Brook, Smith & Reynolds, P.C.

(57) ABSTRACT

The present invention relates to a method for estimating a relative angle (θ) between heading ($X_{10}$) of a person (10) and heading ($X_{12}$) of a mobile device (12) carried by the person. A first estimate of the relative angle is determined using a multi-axis accelerometer (18) of the mobile device. A second estimate of the relative angle is determined using a multi-axis gyroscope (20) of the mobile device. The first estimate and the second estimate are then combined to provide a combined estimate of the relative angle (θ) between the person's heading and the mobile device's heading. The present invention also relates to a system for estimating a relative angle (θ) between heading ($X_{10}$) of a person (10) and heading ($X_{12}$) of a mobile device (12) carried by the person.

9 Claims, 4 Drawing Sheets

(58) Field of Classification Search
USPC ........ 702/104, 141, 151, 160; 701/408, 512, 701/510
See application file for complete search history.

(56) References Cited

U.S. PATENT DOCUMENTS

| | | | |
|---|---|---|---|
| 2012/0296603 A1 | 11/2012 | Kulik et al. | |
| 2016/0097788 A1* | 4/2016 | Looze | G01P 13/02 702/141 |
| 2017/0038213 A1* | 2/2017 | Han | G01C 21/16 |

OTHER PUBLICATIONS

Ali, et al., "Estimation of Heading Misalignment between a Pedestrian and a Wearable Device," IEEE, Trusted Positioning Inc, (TPI) Calgary, AB, Canada, aali@trustedpositioning.com, 6 pages (2014).

Blanke, et al., "Sensing Location in the Pocket," 10th Int. Conference on Ubiquitous Computing, Seoul, South Korea (UbiComp, adjunct proceedings) pp. 1-2, Sep. 21, 2011.

Dang, et al., "DECL: A Circular Inference Method for Indoor Pedestrian Localization Using Phone Inertial Sensors," Seventh International Conference on Mobile Computing and Ubiquitous Networking (ICMU), pp. 117-122 (2014).

Omr, et al., "Using Multiple Sensor Triads for Enhanced Misalignment Estimation for Portable and Wearable Devices," IEEE, Trusted Positioning Inc, (TPI) Calgary, AB, Canada, pp. 1146-1154 (2014).

International Search Report and Written Opinion of the International Searching Authority for International Application No. PCT/SE2014/051437, entitled: "Method and System for Estimating Relative Angle Between Headings," dated Aug. 26, 2015.

Extended European Search Report for European Application No. 14 90 7520, entitled: Method and System for Estimating Relative Angle Between Headings, dated Jun. 19, 2018.

* cited by examiner

METHOD AND SYSTEM FOR ESTIMATING RELATIVE ANGLE BETWEEN HEADINGS

This application is the U.S. National Stage of International Application No. PCT/SE2014/051437, filed Dec. 3, 2014, which designates the U.S., and published in English. The entire teachings of the above application(s) are incorporated herein by reference.

The present invention relates to a method and system for estimating a relative angle between heading of a person and heading of a mobile device carried by the person.

A known way of estimating attitude angle of a user motion with respect to an accelerometer of a mobile device is disclosed in U.S. Pat. No. 8,694,251 (Janardhanan et al.). U.S. Pat. No. 8,694,251 discloses a system which i.a. comprises a multiple-axis accelerometer having acceleration sensors and an electronic circuit operable to generate signals representing components of acceleration sensed by the accelerometer sensors, and to electronically process at least some part of the signals to produce an estimation of attitude of a user motion with respect to the accelerometer. In particular, the electronic circuit in U.S. Pat. No. 8,694,251 is operable to execute a search that electronically rotates said at least part of the signals and estimates a parameter of the signals related to variance, and to estimate a vertical direction and a lateral user direction where the parameter is substantially maximum and where it is substantially minimum respectively.

Another way of determining the relative orientation of a mobile device sensor to the body of a person is disclosed in U Blanke and B Schiele, *Sensing Location in the Pocket,* 2008. Blanke et. al uses inertial sensor data from mobile devices, wherein the recorded sensor data is transformed and normalized. Specifically, an algorithm using body motion as a cue of the sensor's orientation is disclosed, in order to determine the relative orientation of the sensor to the body. Given global orientation and gyroscope values the following steps are performed for each timestamp t: (1) PCA of 3D-gyroscope values over a 1s-window; (2) select first Eigenvector as axis $\omega(t)$; (3) Project $\omega(t)$ onto ground plane; and (4) calculate angle $\alpha$ between $\omega(t)$ and $\omega(t-1)$ and create normalized heading vector.

However, each of the above-mentioned known methods may give an estimation of the relative angle (attitude/orientation) which is not accurate enough, at least for some applications.

It is an object of the present invention to provide a method for estimating a relative angle between a person's heading and the heading of a mobile device born by the person, wherein the relative angle can be estimated with high accuracy.

According to a first aspect of the invention, there is provided a method for estimating a relative angle between heading of a person and heading of a mobile device carried by the person, which method comprises: determining a first estimate of the relative angle using a multi-axis accelerometer of the mobile device; determining a second estimate of the relative angle using a multi-axis gyroscope of the mobile device; and combining the first estimate and the second estimate to a combined estimate of the relative angle between the person's heading and the mobile device's heading.

By combining the first estimate based on input from the accelerometer ('accelerometer model') and the second estimate based on input from the gyroscope ('pendulum model'), a high accuracy estimation of the relative angle may be obtained.

In one embodiment, determining a first estimate of the relative angle using a multi-axis accelerometer of the mobile device may comprise: estimating horizontal acceleration of the mobile device in first and second orthogonal directions when the person is walking or running based on samples from the multi-axis accelerometer; detecting beginning and end of a step of the person from the estimated horizontal accelerations; integrating the estimated horizontal acceleration in the first direction and in the second direction from the detected beginning to the detected end of the step, to provide corresponding velocities in the first and second directions; calculating the norm of the integrated accelerations; finding maximum of the calculated norm of the integrated accelerations; and calculating the first estimate of the relative angle based on the proportion between the velocity in the first direction and the velocity in the second direction for a sample corresponding to said maximum. The accelerometer's measurements may have a lot of noise, but by integrating noisy measurements the Signal-to-Noise Ratio (SNR) may be improved on average. This basically functions as a low-pass filter. Another advantage is that it is not required to determine at what sample (during a step) to perform the calculations.

Alternatively, the first estimate could be determined by studying horizontal accelerations at a time instant during the person's step or by double integrating horizontal accelerations over the complete step. In yet another alternative, the first estimate of the relative angle may be determined using the technique(s) disclosed in the aforementioned U.S. Pat. No. 8,694,251, the content of which herein is incorporated by reference.

Detecting beginning and end of a step of the person may comprise: calculating the norm of the estimated horizontal accelerations; identifying a peak of the calculated norm of the estimated horizontal accelerations, which peak is over a predetermined threshold; selecting the closest local minimum of the calculated norm before the identified peak as beginning of the step; and selecting the closest local minimum of the calculated norm after the identified peak as end of the step.

Determining a second estimate of the relative angle using a multi-axis gyroscope of the mobile device may comprise: estimating an axis that the mobile device is rotating about with respect to pendulous motion; estimating the heading of the person as a direction which is perpendicular to the estimated axis in a ground plane; and obtaining the second estimate of the relative angle by comparing the estimated heading of the person to a projection of the mobile device's heading on the ground plane. The ground plane is typically the horizontal plane. Alternatively, the second estimate of the relative angle may be determined using the technique disclosed in the aforementioned U Blanke and B Schiele, *Sensing Location in the Pocket,* 2008, the content of which herein is incorporated by reference.

The first estimate and the second estimate may be combined using Kalman filtering.

The method may further comprise: detecting absolute heading of the mobile device by using a compass; and estimating absolute heading of the person based on the detected absolute heading of the mobile device and said combined estimate of the relative angle.

The method may further comprise: providing the combined estimate of the relative angle as an output signal to an indoor positioning system (IPS) or a pedestrian dead reckoning system (PDRS).

According to a second aspect of the invention, there is provided a system for estimating a relative angle between heading of a person and heading of a mobile device carried by the person, which system comprises: the mobile device, wherein the mobile device comprises a multi-axis accelerometer and a multi-axis gyroscope; and a processor capable of communicating with the multi-axis accelerometer and the multi-axis gyroscope, wherein the processor is configured to: determine a first estimate of the relative angle based on data from the multi-axis accelerometer; determine a second estimate of the relative angle based on data from the multi-axis gyroscope of the mobile device; and combine the first estimate and the second estimate to a combined estimate of the relative angle between the person's heading and the mobile device's heading. This aspect may exhibit the same or similar features and technical effects as the first aspect, and vice versa.

The processor may be included in the mobile device. Alternatively, the processor may be included in a remote device of the system, i.e. not in the mobile device. By performing the calculations in a remote device rather than in the mobile device, less processing power in the mobile device is needed.

These and other aspects of the present invention will now be described in more detail, with reference to the appended drawings showing one or more embodiments of the invention.

With reference to FIGS. 1-4, the present invention relates to a method for estimating the relative angle θ between heading $X_{10}$ of a person 10 and heading $X_{12}$ of a mobile device 12 carried by the person 10. The method is computer-implemented. The heading $X_{10}$ of the person 10 is typically the same as the person's course when the person is walking or running. The course of the mobile device 12 is the same as the course of the person 10, but the heading $X_{12}$ of the mobile device may indeed be different than its course depending on how the mobile device 12 is carried by the person 10.

Figure 1:
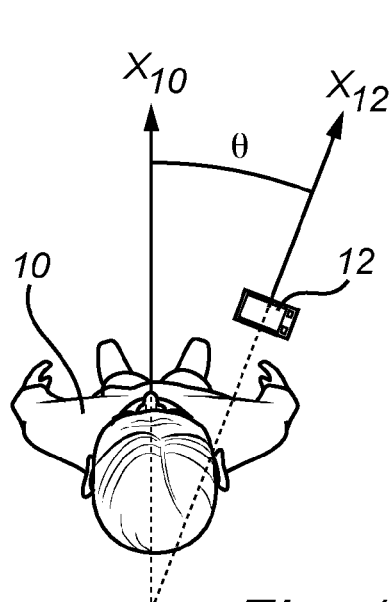
FIG. 1 is top view of a person and a mobile device.
Figure 2:
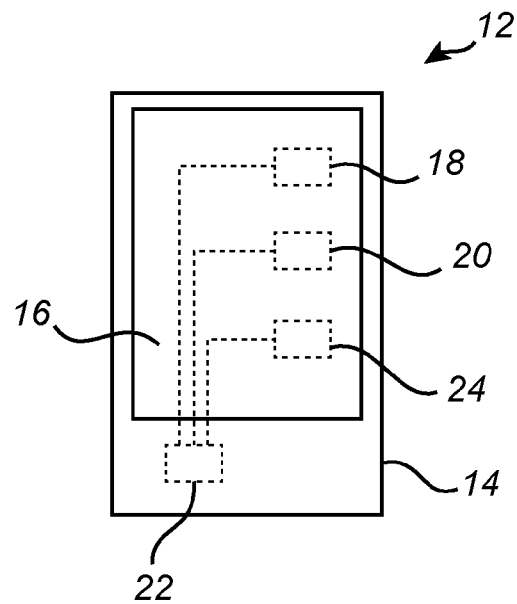
FIG. 2 is a schematic front view of a mobile device according to an embodiment of the present invention.
Figure 3:
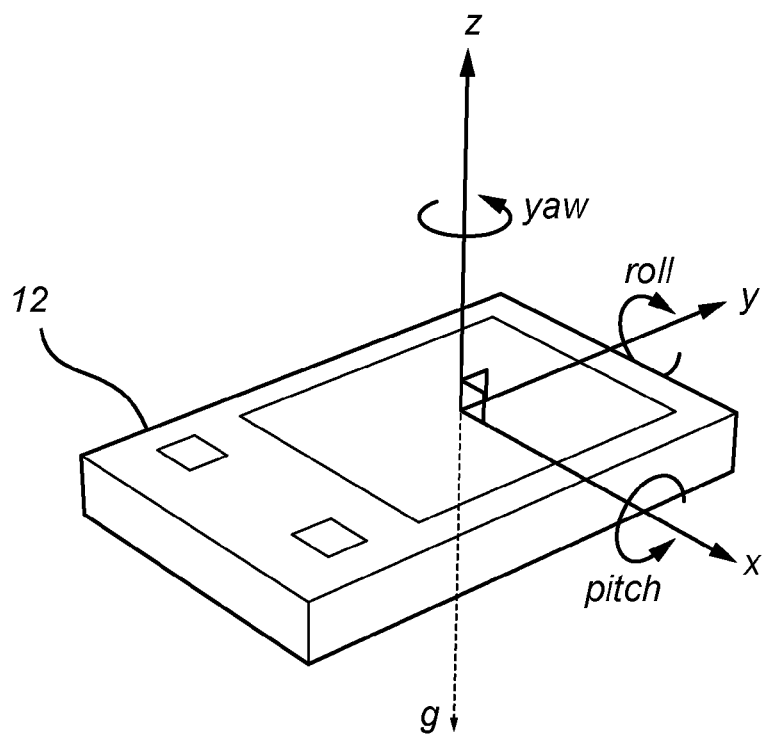
FIG. 3 is a perspective view of the mobile device of FIG. 2.
Figure 4:
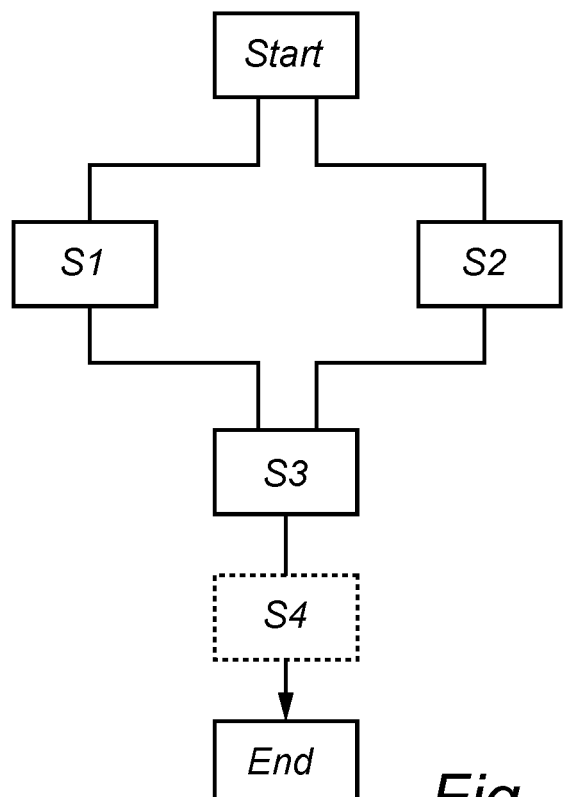
FIG. 4 is a flow chart of a method according to an embodiment of the present invention.

The mobile device 12 (FIG. 2) may be a mobile communication device, such as a mobile phone or smart phone. The mobile device 12 has a housing 14 and a screen 16. The housing 14 may have the general shape of a rectangular box. The mobile device 12 further comprises a multi-axis accelerometer 18 and a multi-axis gyroscope 20. The multi-axis accelerometer 18 may be a three-axis accelerometer, and the multi-axis gyroscope 20 may be a three-axis gyroscope. The accelerometer 18 and the gyroscope 20 are fixedly mounted in the housing 14 of the mobile device 12. The accelerometer 18 and the gyroscope 20 are connected to a processor 22 of the mobile device 12. The processor 22 is generally configured to perform various method steps of the present invention. The accelerometer 18 is adapted to detect acceleration in three orthogonal axes in the accelerometer's frame of reference, namely x-axis acceleration, y-axis acceleration and z-axis acceleration, as shown in FIG. 3. The gyroscope is adapted to detect rotation about the same axes, namely x-axis rotation (pitch), y-axis rotation (roll) and z-axis rotation (yaw), as also shown in FIG. 3. The mobile device 12 may optionally further comprise a compass 24, for example an electronic compass (e-compass). The compass 24 is also connected to the processor 22.

In the method (FIG. 4), a first estimate of the relative angle θ is determined (step S1) using the multi-axis accelerometer 18, and a second estimate of the relative angle θ is determined (step S2) using the multi-axis gyroscope 20. The first and second estimates are then combined (step S3) to a combined estimate of the relative angle θ between the heading $X_{10}$ of the person 10 and the heading $X_{12}$ of the mobile device 12. The first and second estimates may for example be combined using Kalman filtering. By combining the first estimate based on input from the accelerometer 18 and the second estimate based on input from the gyroscope 20, a high accuracy estimation of the relative angle θ may be obtained.

The method may optionally detect (step S4) the absolute heading of the mobile device 12, by using the compass 24, and estimate the absolute heading of the person 10 based on the detected absolute heading of the mobile device 12 and the combined estimate of the relative angle θ.

The combined estimate of the relative angle θ and/or the absolute heading of the person may beneficially be provided as an output signal to an indoor positioning system or a pedestrian dead reckoning system.

Accelerometer Model

Figure 5:
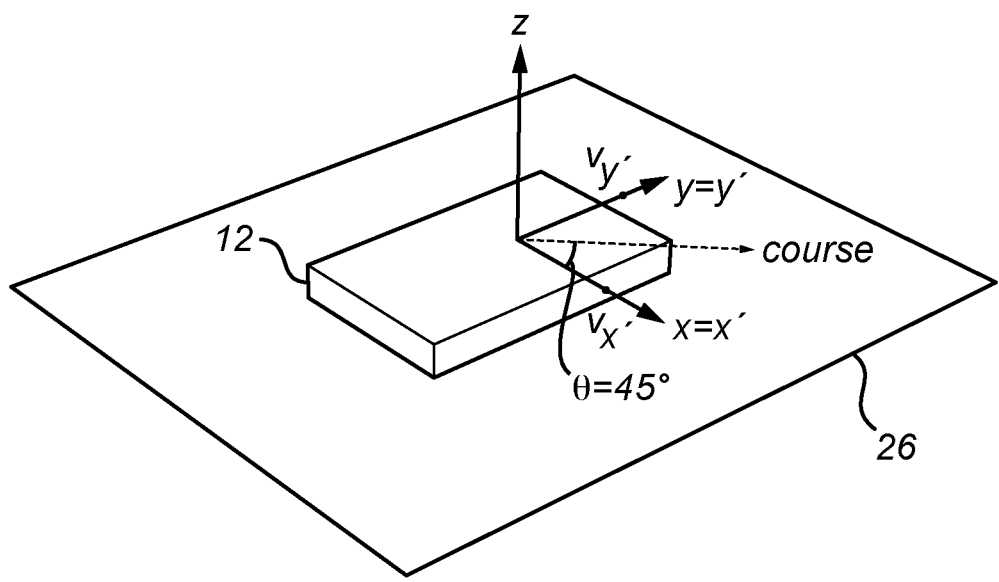
FIG. 5 is a perspective view similar to FIG. 4.

Step S2 of determining the first estimate of the relative angle θ using the multi-axis accelerometer 18 according to an embodiment of the invention will now be described with reference to FIGS. 5-7.

First, horizontal acceleration of the mobile device 12 in first and second orthogonal directions x', y' is estimated based on samples from the multi-axis accelerometer 18 when the person 10 is walking or running. If the mobile device 12 is flush with a horizontal plane 26 as shown in FIG. 5, the first direction and second directions x', y' may correspond to the x-axis and y-axis of the accelerometer 18, respectively. However, is the mobile device 12 is tilted with respect to the horizontal plane 26, the acceleration samples from the accelerometer 18 should be transformed from the accelerometer's frame of reference to the Earth or World coordinate frame, which includes the horizontal plane. In other words, the acceleration samples may be "tilt-adjusted". 'Horizontal acceleration(s)' herein typically refers to accelerations in or parallel to a ground plane at the person's location.

Then, steps of the person 10 are detected by studying the estimated horizontal accelerations of the mobile device 12. Specifically, the norm of the estimated horizontal acceleration in the first direction x' and the estimated horizontal acceleration in the first direction y' is calculated:

$$\text{norm}_{acc} = \sqrt{acc_{x'}^2 + acc_{y'}^2}$$

Figure 6:
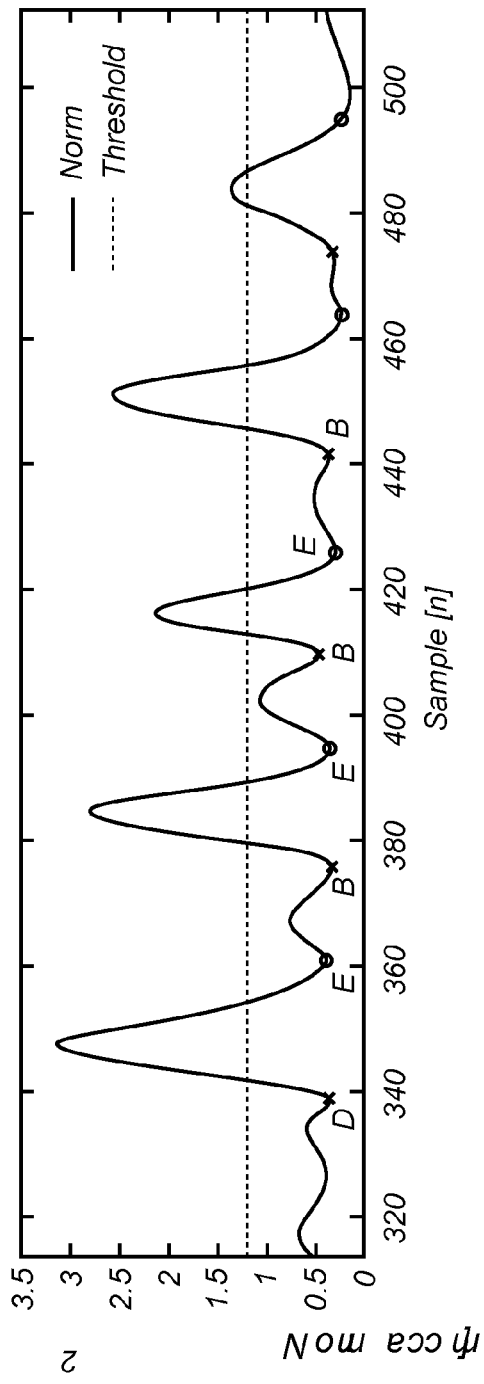
FIG. 6 is a diagram of norm acc over time.
Figure 7:
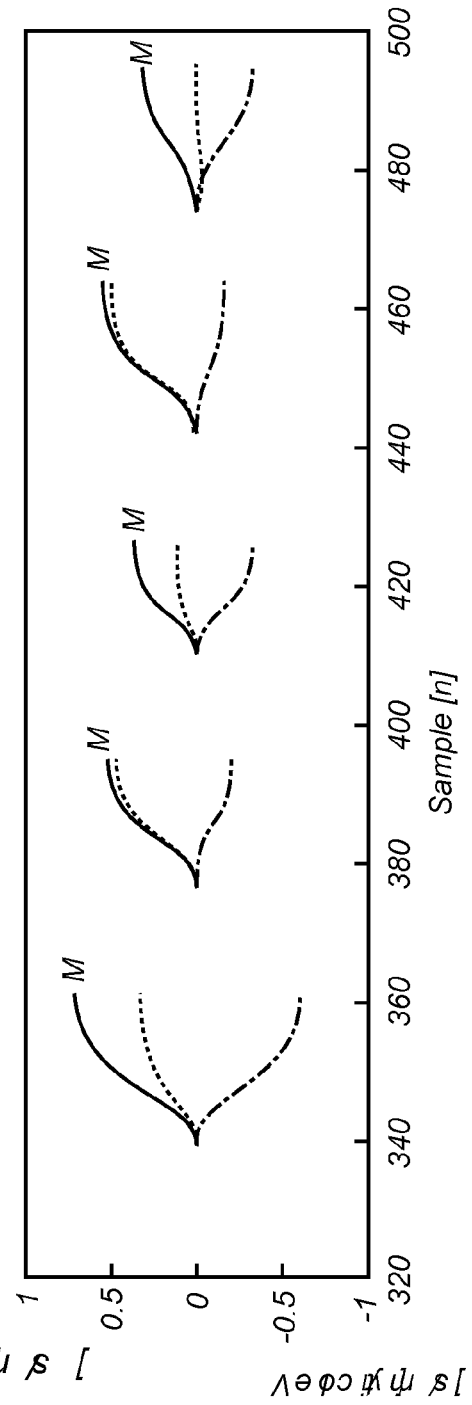
FIG. 7 is a diagram of velocities over time.

An example of the calculated norm over time (samples) is shown in FIG. 6. Thereafter, a peak of the calculated norm of the estimated horizontal accelerations is identified, which peak is over a predetermined threshold. The method then finds where the norm's derivative is 0 before and after the identified peak, wherein the closest local minimum of the calculated norm before the identified peak is selected as the beginning B of the step, and the closest local minimum of the calculated norm after the identified peak is selected as the end E of the step. Several steps of the person are indicated in FIG. 6.

When beginning B and end E of a step of the person 10 have been detected, the estimated horizontal accelerations in both the first direction x' and in the second direction y' are integrated over the complete step. This gives the change in velocity in both the first direction x' and the second direction y', see FIG. 7. Then the norm of the integrated accelerations is calculated. This norm has a maximum M, and the sample (time) corresponding to the maximum is used to calculated the first estimate of the relative angle θ. Specifically, the first estimate of the relative angle θ is calculated based on the proportion between the velocity in the first direction x' and the velocity in the second direction y' for said sample. For example, if the velocity $v_{x'}$ in the first direction x' is equal to the velocity $v_{y'}$ in the second direction y', then the first estimate of the relative angle θ is 45 deg. This example is illustrated in FIG. 5. Mathematically, the first estimate of the relative angle θ may be calculated as:

$$\arctan\left(\frac{v_{y'}}{v_{x'}}\right).$$

Pendulum Model

Step S3 of determining the second estimate of the relative angle using the multi-axis gyroscope 20 according to an embodiment of the invention will now be described with reference to FIGS. 8a-8c and 9.

The pendulum model is based on the assumption that the mobile device 12 is borne on the leg, hip or other locations (of the person 10) subjected to pendulous motion, and it makes use of the changes in tilt angles that the leg or hip or other location and the mobile device are subjected to. R in FIGS. 8a-8c denotes the right leg of the person 10, and L denotes the left leg.

Figures 8A, 8B, 8C:
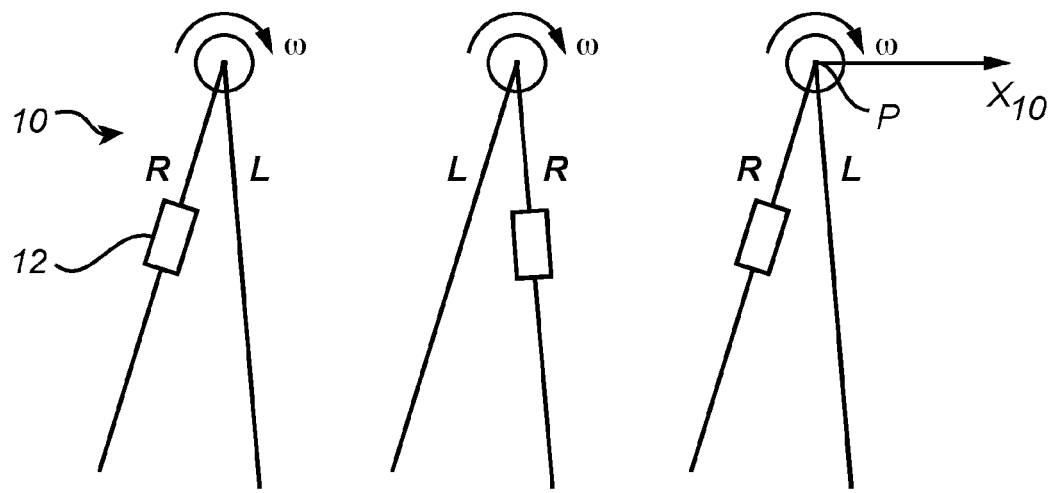
FIGS. 8a-8c are schematic side view of a person's gait.

Specifically, step S3 may comprise estimating an axis P that the mobile device 10 is rotating about with respect to pendulous motion when the person 10 is walking or running. ω is the rotation around axis P. This axis of rotation P seen in FIGS. 8a-8c is estimated by comparing the orientation of the mobile device 12 to a reference orientation, which for example can be the moving average of the orientation during walk. An estimate of the axis P can be calculated by comparing the latest estimate of the orientation to the previous estimate. These estimates of P can then be low-pass filtered to reduce the effects of measurement noise.

Figure 9:
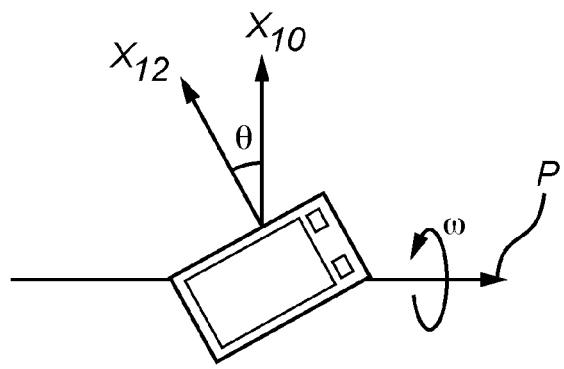
FIG. 9 is a top view of the device carried by the person of FIG. 8c.

Given an accurate estimate of the axis P, an estimate of the forward direction $X_{10}$ of the person's walk (gait) is given as the axis/direction which is perpendicular to P in the horizontal plane. The forward direction $X_{10}$ is then compared to a projection of the mobile device's x-axis $X_{12}$ on the horizontal plane to get the second estimate of the relative angle θ, as seen in FIG. 9.

Figure 10:
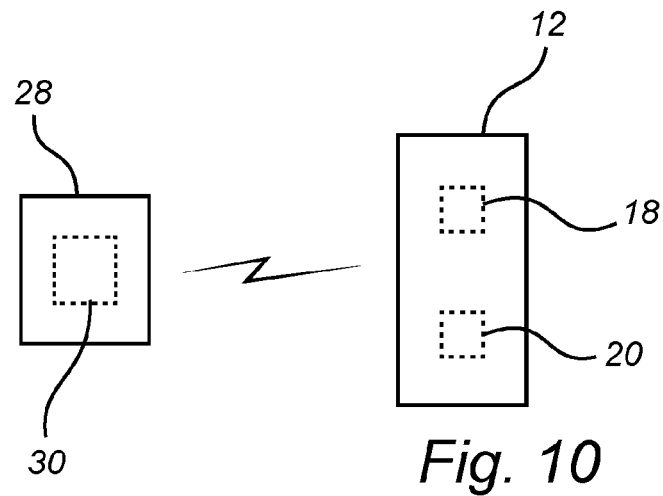
FIG. 10 shows a system comprising a remote device according to an embodiment of the present invention.

The mobile device 12 may constitute a system for estimating the relative angle θ between its heading $X_{12}$ and the heading $X_{10}$ of the person 10 carrying it. Alternatively, such a system may comprise a remote device 28, i.e. not part of the mobile device 12, which remote device 28 in turn comprises a processor 30 configured to perform various method steps of the present invention. Here, less processing power in the mobile device 12 is needed. The alternative system is schematically illustrated in FIG. 10. The processor 28 of the remote device may for example be configured to determine the first and second estimates of the relative angle based on data from the multi-axis accelerometer and the multi-axis gyroscope, respectively, and combine the first estimate and the second estimate to a combined estimate of the relative angle θ. The remote device may for example be a computer or a server capable of communicating with the mobile device 12, for example over a wireless connection.

The person skilled in the art realizes that the present invention by no means is limited to the preferred embodiments described above. On the contrary, many modifications and variations are possible within the scope of the appended claims.

The invention claimed is:

1. A method for estimating a relative angle between heading of a person and heading of a mobile device carried by the person, which method comprises:
   determining a first estimate of the relative angle using a multi-axis accelerometer of the mobile device;
   determining a second estimate of the relative angle using a multi-axis gyroscope of the mobile device, including:
      estimating an axis that the mobile device is rotating about with respect to pendulous motion;
      estimating the heading of the person as a direction which is perpendicular to the estimated axis in a ground plane; and
      obtaining the second estimate of the relative angle by comparing the estimated heading of the person to a projection of the mobile device's heading on the ground plane; and
   combining the first estimate and the second estimate to a combined estimate of the relative angle between the person's heading and the mobile device's heading.

2. A method according to claim 1, wherein the first estimate and the second estimate are combined using Kalman filtering.

3. A method according to claim 1, which method further comprises:
   detecting absolute heading of the mobile device by using a compass; and
   estimating absolute heading of the person based on the detected absolute heading of the mobile device and said combined estimate of the relative angle.

4. A method according to claim 1, which method further comprises:
   providing the combined estimate of the relative angle as an output signal to an indoor positioning system or a pedestrian dead reckoning system.

5. A method for estimating a relative angle between heading of a person and heading of a mobile device carried by the person, which method comprises:
   determining a first estimate of the relative angle using a multi-axis accelerometer of the mobile device;
   determining a second estimate of the relative angle using a multi-axis gyroscope of the mobile device; and
   combining the first estimate and the second estimate to a combined estimate of the relative angle between the person's heading and the mobile device's heading;
   wherein determining a first estimate of the relative angle using a multi-axis accelerometer of the mobile device comprises:
   estimating horizontal acceleration of the mobile device in first and second orthogonal directions when the person is walking or running based on samples from the multi-axis accelerometer;
   detecting beginning and end of a step of the person from the estimated horizontal accelerations;
   calculating integrated accelerations by integrating the estimated horizontal acceleration in the first direction and in the second direction from the detected beginning to the detected end of the step, to provide corresponding velocities in the first and second directions;

calculating the norm of the integrated accelerations;

finding maximum of the calculated norm of the integrated accelerations; and calculating the first estimate of the relative angle based on the proportion between the velocity in the first direction and the velocity in the second direction for a sample corresponding to said maximum.

6. A method according to claim 5, wherein detecting beginning and end of a step of the person comprises:

calculating the norm of the estimated horizontal accelerations;

identifying a peak of the calculated norm of the estimated horizontal accelerations, which peak is over a predetermined threshold;

selecting the closest local minimum of the calculated norm before the identified peak as beginning of the step; and selecting the closest local minimum of the calculated norm after the identified peak as end of the step.

7. A system for estimating a relative angle between heading of a person and heading of a mobile device carried by the person, which system comprises:

the mobile device, wherein the mobile device comprises a multi-axis accelerometer and a multi-axis gyroscope; and a processor capable of communicating with the multi-axis accelerometer and the multi-axis gyroscope, wherein the processor is configured to:

determine a first estimate of the relative angle based on data from the multi-axis accelerometer;

determine a second estimate of the relative angle based on data from the multi-axis gyroscope of the mobile device, including:

estimating an axis that the mobile device is rotating about with respect to pendulous motion;

estimating the heading of the person as a direction which is perpendicular to the estimated axis in a ground plane; and obtaining the second estimate of the relative angle by comparing the estimated heading of the person to a projection of the mobile device's heading on the ground plane; and combine the first estimate and the second estimate to a combined estimate of the relative angle between the person's heading and the mobile device's heading.

8. A system according to claim 7, wherein said processor is included in the mobile device.

9. A system according to claim 7, wherein said processor is included in a remote device of the system.

* * * * *